Aug. 1, 1967  V. E. SCAFURO  3,333,701
FILTER DEVICE FOR AQUARIUM TANKS
Filed June 28, 1965  2 Sheets-Sheet 1

INVENTOR.
VICTOR E. SCAFURO
BY
ATTORNEY

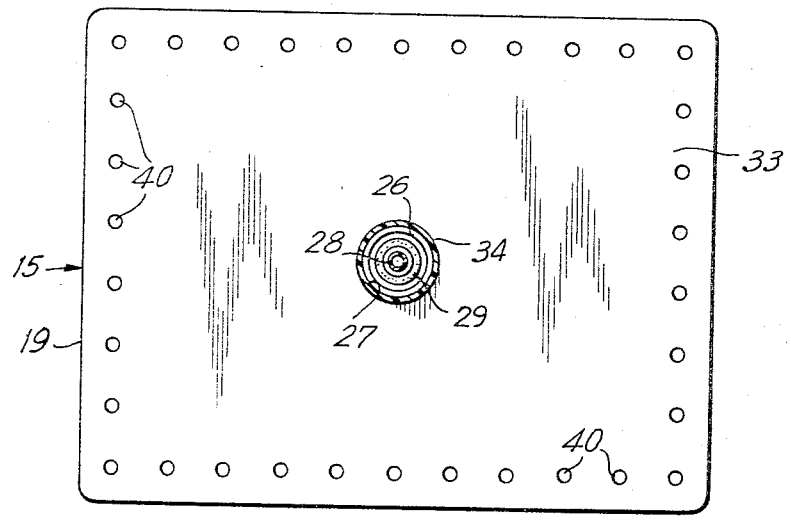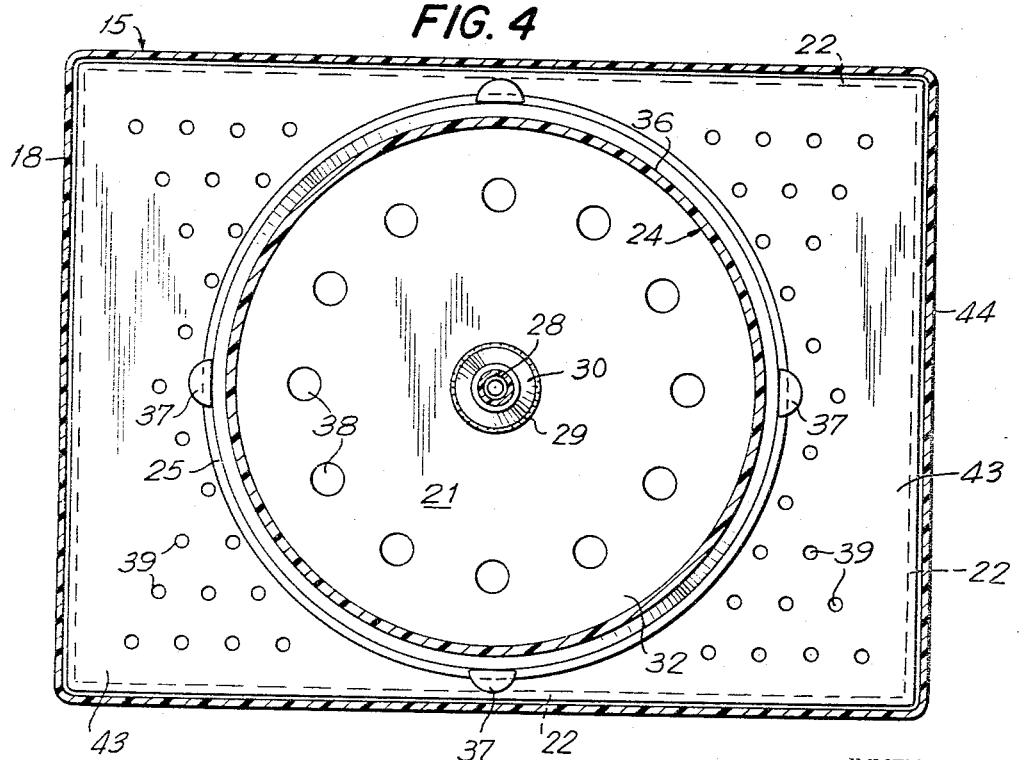

United States Patent Office 3,333,701
Patented Aug. 1, 1967

3,333,701
FILTER DEVICE FOR AQUARIUM TANKS
Victor E. Scafuro, Allendale, N.J., assignor to Sternco Industries, Inc., Allendale, N.J., a corporation of New Jersey
Filed June 28, 1965, Ser. No. 467,654
7 Claims. (Cl. 210—169)

ABSTRACT OF THE DISCLOSURE

A filter device for placement in an aquarium tank and connected to an outside air pump for drawing the tank water through filtering material and aerating said water. A funnel-like member within the device constitutes an air and water flow chamber with the neck portion serving as a restricted passageway for the discharge into the tank of the admixed air from the pump and water drawn from the filtering material, the air inlet pipe entering through said passageway and terminating at the mouth of the funnel-like member. There is a base chamber that communicates with the filter portion of the device and the interior of the said member.

---

This invention relates to filter devices for aquarium tanks, and is particularly directed to devices of this category employing water filtering, purifying and aerating means.

It is an important object of my invention to provide effective and thorough aeration of aquarium water operatively drawn therethrough. In the accomplishment of this objective I employ air as the water pumping medium whereby the water and air are caused simultaneously to flow through a restricted discharge passageway, resulting in a thorough admixture of the currents of air and water for effective aeration of the water being returned to the tank.

Another object of my invention is the provision of means for effecting a higher rate of water flow through suitable filtering and purifying material, such as fiber glass and carbon granules, whereby a highly efficient filtering process results. In the accomplishment of this objective I employ the aforesaid restricted water and air discharge passageway in combination with an expanded water inlet region, whereby the relatively high flow-velocity within said restricted passageway causes a relatively high negative pressure effective in sucking up the relatively large volume of water at said inlet region.

And it is a further objective of this invention to provide a relatively simple, inexpensive and readily assembled device having the features above-mentioned.

Other objects, features and advantages will appear from the drawings and the description hereinafter given.

Referring to the drawings,

FIG. 3 is a somewhat reduced plan section of the filter device of FIG. 2, the section being taken along line 3—3.

FIG. 4 is a section of FIG. 2 taken substantially along line 4—4, the filter material being removed.

Figure 1:
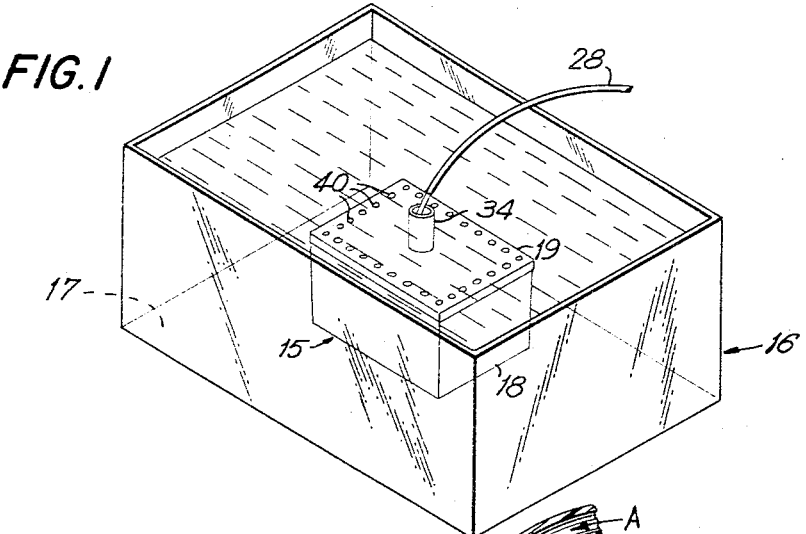
FIG. 1 is a perspective view of the filter device of this invention shown operatively disposed within an aquarium tank.
Figure 2:
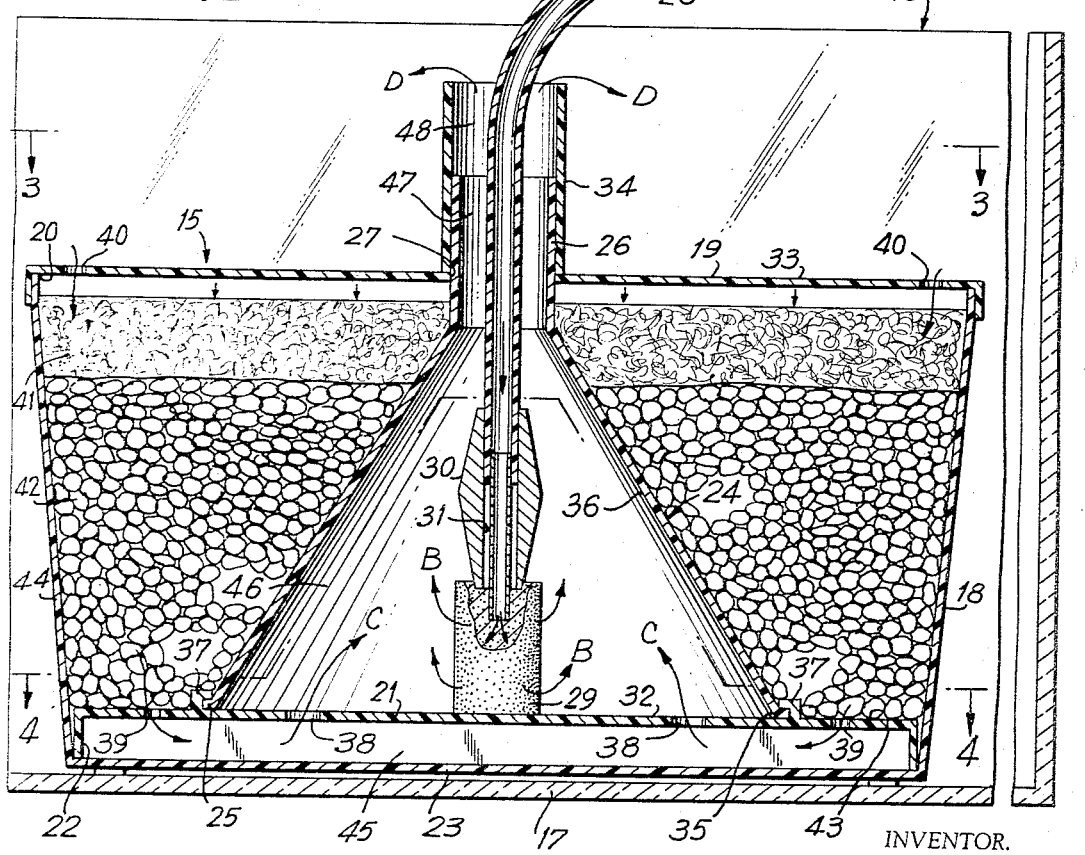
FIG. 2 is a fragmentary vertical cross-section of said tank with the said filter device therein.

In the form of my invention illustrated, the entire filtering device generally referred to by the reference numeral 15 is positioned within the aquarium tank 16, preferably upon the floor 17 thereof. The main components of the device 15 comprise the casing 18, the cover 19 removably positioned over the open top portion 20 of the casing, the base 21 with downwardly extending peripheral walls 22 resting upon the bottom wall 23 of the said casing, the funnel-like member 24, the lower peripheral mouth edge 25 thereof resting upon said base 21, the upper reduced neck portion 26 extending upwardly through the central aperture 27 in said cover 19, the air inlet pipe 28 extending from an air pump (not shown) known to those familiar with the art, and a porous air stone 29 attached to and in communication with said pipe 28. In the preferred form shown, a weighted member 30 with an axial hole 31 envelops the lower portion of said air pipe 28 and extends partly into the upper portion of said air stone 29, thereby serving gravitationally to maintain said stone in its optimum operative position upon the horizontal wall 32 of said base 21; and resting upon the horizontal wall 33 of said cover 19 is the cylindrical funnel-neck extension member 34 enveloping the upwardly protruding portion of said neck portion 26 and extending thereabove to a point within the confines of said aquarium tank 16.

In the embodiment illustrated, the said peripheral edge 25 is in the form of an outwardly extending flange which defines the mouth portion 35 at the large diameter end of the conical wall 36 of the said funnel-like member 24. Extending upwardly from the said base wall 32 are the retaining clips 37 which overlap the said peripheral flange 25 and serve to hold said member 24 in place. It is preferred that said clips 37 and said member 24 be made of slightly resilient or yieldable material, thereby facilitating the attachment of member 24 to the said base 21 and its detachment therefrom.

The said wall 32 of the base 21 contains a plurality of inlet openings 38, hereinafter referred to as secondary inlet openings, disposed within the confines of the conical wall 36, such openings being preferably in circular formation surrounding the said air stone 29. Said wall 32 also contains another plurality of openings 39, hereinafter referred to as primary inlet openings, disposed exteriorly of said conical wall 36. The said wall 33 of the said cover member 19 contains, preferably although not necessarily near the periphery thereof, a plurality of water entrance apertures 40 through which the water of the tank 16 is dawn downwardly for purification purposes in a manner hereinbelow set forth.

At the upper portion of the filter casing 18 is a layer of suitable filter material such as fiber glass 41, and therebelow is disposed other suitable purifying material such as the mass of carbon granules 42, the latter mass being supported by the peripheral portion 43 of the base 21 (exteriorly of the bottom mouth portion 35 of the member 24), the conical wall 36 of said member 24 and the lateral walls 44 of said casing 18.

The arrangement is such as to provide a base chamber 45 below the wall 32 of said base 21, a conical flow chamber 46 above said wall 32 of progressively decreasing diameter upwardly, a restricted discharge passageway 47 defined by said neck portion 26, and an extension discharge channel 48 defined by said extension member 34.

In the operation of this device, air is pumped through the pipe 28 in the direction of the arrows A to the said porous air stone 29, the air emerging, in known manner, from the outer surface of said stone and rising upwardly, in the form of bubbles, in the direction of the arrows B, thereby inducing an upward current of water within said flow chamber 46. This upward current flow causes water to be drawn from the tank 16 through the said entrance apertures 40 in said cover 19, the water being pulled downwardly through the glass fiber layer 41 and the mass of carbon granules 42, such currents of water thereby undergoing the process of filtration and purification. The cleansed currents of water are then drawn through the primary inlet openings 39 in the said base member 21 to enter the base chamber 45 and be drawn upwardly through the said secondary inlet openings 38 in said wall 32 in the direction of arrows C. As the water currents move upwardly within the flow chamber 46 they become admixed with the air emerging from said air stone 29— the admixed current of air and water continuing its upward flow through the said restricted discharge passageway 47 into the said extension discharge channel 48 and then, in the direction of arrows D, back into the tank 16 in fully filtered, purified and aerated condition.

It is to be noted that due to the relatively ample proportions of the bottom portion of the flow chamber 46, the mouth portion 35 of the conical wall 36 accommodates a relatively large cross-section of water flowing upwardly to be aerated. Due to the progressively upwardly decreasing cross-section of the flow chamber 46, the velocity of upward flow correspondingly increases, the velocity being greatest in the restricted passageway 47 within the neck portion 26 of member 24. This condition is enhanced by the upward movement of the air within said restricted passageway under the action of its forced flow through said pipe 28, the increased velocity of the air within the water current in said restricted passageway producing a correspondingly increased negative pressure, akin to a Venturi effect. It has been found that this increased negative pressure within said restricted passageway 47 causes a very considerable upward pull on the water currents within the flow chamber 46, whereby water is drawn into the filter device 15 and through the filtering and purifying materials therein at a greater rate than is possible with conventional filter constructions, resulting in correspondingly more effective cleansing of the tank water.

Furthermore, due to the converging directions of the water as it flows upwardly within the flow chamber 46 toward the passageway 47, and due to the restricted proportions of said passageway, the water and air are brought into relatively intimate contact in that region, resulting in thorough aeration.

The entire device, consisting of relatively simple and easily assembled components, thus provides means both for comparatively rapid filtration and purification of aquarium tank water, and for its thorough aeration.

In the above description, the invention has been disclosed merely by way of example and in preferred manner; but obviously many variations and modifications may be made thereon. It is to be understood, therefore, that the invention is not limited to any form or manner of practicing same, except insofar as such limitations are specified in the appended claims.

I claim:

1. In a filter device for an aquarium tank, a casing, a base member at the bottom of said casing and defining a base chamber, said base member having a horizontal wall at the top of said base chamber, a conical funnel-like member with its mouth portion disposed above said base member and its neck portion extending above the top of said casing, said neck portion defining a restricted passageway and the portion of said funnel-like member therebelow defining a flow chamber, said casing having a filter portion exteriorly of said funnel-like member adapted to house water-purifying means therein, said horizontal wall having primary apertured means disposed exteriorly of said funnel-like member and secondary apertured means disposed within the confines of the mouth portion of said funnel-like member, said primary apertured means communicating between said filter portion and said base chamber, said secondary apertured means communicating between said base chamber and said flow chamber, water entrance means at the upper portion of said casing in communication with said filter portion thereof, and an air inlet pipe extending into and communicating with said flow chamber, whereby air operatively entering said flow chamber will operatively rise toward said restricted passageway, thereby causing water to be operatively drawn through said entrance means and downwardly through said filter portion of said casing, into said base chamber, upwardly through said flow chamber and into contact with said air within said restricted passageway, and outwardly therefrom.

2. In a filter device for an aquarium tank, the combination according to claim 1, said base member having downwardly extending peripheral walls resting upon the bottom of said casing, said walls defining said base chamber, said respective apertured means each comprising a plurality of openings, whereby said primary inlet openings communicate between said filter portion of the casing and said base chamber, and said secondary inlet openings communicate between said base chamber and said flow chamber.

3. In a filter device for an aquarium tank, the combination according to claim 1, said casing having a cover member, said cover member having a plurality of entrance openings therein constituting said water entrance means and an apertured portion through which said neck portion of said funnel-like member extends.

4. In a filter device for an aquarium tank, the combination according to claim 1, said air inlet pipe extending through said restricted passageway and terminating within said flow chamber, and a porous air stone attached to and communicating with the terminal portion of said air pipe, said air stone resting upon the horizontal wall of said base member, said secondary apertured means comprising a plurality of inlet openings surrounding the portion of said horizontal wall upon which said air stone rests.

5. In a filter device for an aquarium tank, the combination according to claim 4, and a weighted member with an axial hole therein enveloping the lower portion of said air pipe and in engagement with said air stone, whereby said air stone will be maintained in operative engagement with said base member.

6. In a filter device for an aquarium tank, the combination according to claim 1, said casing having a cover member, said cover member having an apertured portion through which said neck portion of said funnel-like member extends, and a laterally enclosed open-ended extension member resting upon said cover member and enveloping said neck portion of the funnel-like member, said extension member extending above said neck portion and defining an extension discharge channel.

7. In a filter device for an aquarium tank, the combination according to claim 1, the said mouth portion of said funnel-like member being defined by a peripheral edge having an outwardly extending flange, said horizontal wall having retaining means in engagement with said flange to maintain said funnel-like member in engagement with said horizontal wall of said base member.

References Cited

UNITED STATES PATENTS

| 1,574,783 | 3/1926 | Beth | 210—169 X |
| 2,676,921 | 4/1954 | Vansteenkiste | 210—169 |
| 2,744,065 | 5/1956 | Lacey | 210—169 |
| 2,782,161 | 2/1957 | Willinger et al. | 210—169 |
| 2,786,026 | 3/1957 | Stark | 210—169 |
| 3,247,826 | 4/1966 | Girard | 210—169 X |

FOREIGN PATENTS

| 817,976 | 10/1951 | Germany. |
| 963,382 | 5/1957 | Germany. |

REUBEN FRIEDMAN, *Primary Examiner.*

F. MEDLEY, *Assistant Examiner.*